United States Patent
Miki (10) Patent No.: US 9,354,044 B2
(45) Date of Patent: May 31, 2016

(54) THICKNESS MEASUREMENT APPARATUS AND THICKNESS MEASUREMENT METHOD

(71) Applicant: MITUTOYO CORPORATION, Kanagawa (JP)

(72) Inventor: Yutaka Miki, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/795,311

(22) Filed: Jul. 9, 2015

(65) Prior Publication Data

US 2016/0018213 A1  Jan. 21, 2016

(30) Foreign Application Priority Data

Jul. 18, 2014 (JP) ................. 2014-147542

(51) Int. Cl.
*G01B 11/06* (2006.01)

(52) U.S. Cl.
CPC ............ *G01B 11/06* (2013.01); *G01B 2210/50* (2013.01)

(58) Field of Classification Search
CPC ............... G02B 27/0172; G02B 2027/0118; G02B 2027/0178; G02B 27/0093; G02B 2027/0138; G02B 2027/0174; G02B 2027/0187; G02B 5/30; G02B 27/0176; G02B 27/0101; G02B 2027/0116; G02B 2027/0194; G02B 26/08

See application file for complete search history.

(56) References Cited

U.S. PATENT DOCUMENTS

2008/0310016 A1* 12/2008 Karasawa .......... G02B 21/0088
                                                    359/383
2010/0157763 A1*  6/2010 Verbeek ................ G11B 19/12
                                                    369/53.22

FOREIGN PATENT DOCUMENTS

JP      2011-39026      2/2011

* cited by examiner

*Primary Examiner* — Michael P Stafira
(74) *Attorney, Agent, or Firm* — Greenblum & Bernstein, P.L.C.

(57) ABSTRACT

A thickness measurement apparatus includes a light source emitting light; an optical system focusing the light emitted from the light source onto an optical axis; a reflector reflecting light focused by the optical system; a detector detecting intensity of the reflected light according to a position on the optical axis where the light passing through the optical system is in focus; and a calculator calculating thickness of a measured object using a refractive index of the measured object and an amount of displacement between a first focus position and a second focus position.

10 Claims, 7 Drawing Sheets

Fig. 7

THICKNESS MEASUREMENT APPARATUS AND THICKNESS MEASUREMENT METHOD

CROSS-REFERENCE TO RELATED APPLICATIONS

The present application claims priority under 35 U.S.C. §119 of Japanese Application No. 2014-147542, filed on Jul. 18, 2014, the disclosure of which is expressly incorporated by reference herein in its entirety.

BACKGROUND OF THE INVENTION

1. Field of the Invention

The present invention relates to a thickness measurement apparatus and a thickness measurement method, and in particular relates to a thickness measurement apparatus and a thickness measurement method applied to measurement of a thickness of a thin measured object that is highly transparent, such as a transparent film.

2. Description of Related Art

Conventionally, a confocal point displacement gauge, chromatic confocal-type displacement gauge, spectral interference-type thickness gauge, and the like are known as devices conducting non-contact measurement of the thickness of a thin, plane parallel plate-shaped transparent measured object, such as a film or sheet.

For example, in a confocal point displacement gauge, a focal position of light fired at a measured object is changed, and a position of the measured object is detected using the focal position where an amount of reflected light passing through a pinhole provided at a confocal point position is greatest.

In addition, in a chromatic confocal-type displacement gauge, light from a white light source is fired (i.e., emitted) at a measured object using a field lens having significant axial chromatic aberration, and the most intense wavelength in the reflected light passing through a pinhole provided at the confocal point position is detected, thereby detecting a position of the measured object. Japanese Patent Laid-open Publication No. 2011-39026 discloses a chromatic confocal-type displacement gauge having high resolution and high-speed response.

In a spectral interference-type thickness gauge, light from a white light source is fired at a measured object, and light reflected off a front surface of the measured object and light reflected off a back surface of the measured object scatter and then are caused to interfere with each other; thereby, an intensity pattern of light interference with respect to light wavelength is obtained and a position of the measured object is detected.

However, in the conventional confocal point displacement gauge and the chromatic confocal-type displacement gauge, in a case where the measured object is a thin transparent body having a thickness of 10 μm or less, for example, the light reflected by the front surface of the transparent body is difficult to distinguish from the light reflected by the back surface of the transparent body because the two lights are too close together, and a thickness measurement cannot be made with a high degree of accuracy.

In addition, in the spectral interference-type thickness gauge, although a thin transparent body having a thickness of 10 μm or less can be measured, measurement of a thick transparent body of 1 mm or more is difficult. This is because the intensity pattern of the light interference with respect to the thick transparent body becomes too narrow and detection with an image sensor or the like becomes difficult. In addition, responsiveness may be problematic. In other words, in the spectral interference-type thickness gauge, all pixels of the image sensor are photoreception pixels, and therefore detection of an amount of light received takes time. Moreover, data for a massive amount of light received by all pixels of the image sensor is analyzed by FFT (Fast Fourier Transform) and the thickness of the measured object is calculated. Therefore, calculation time may become extended.

Further, in the conventional technologies, a size of a measurement spot is determined by design specifications, and therefore the size of the measurement spot cannot be changed at the time of measurement.

SUMMARY OF THE INVENTION

The present invention provides a non-contact thickness measurement apparatus and thickness measurement method, which can measure thickness of a transparent, plane parallel plate-shaped measured object (such as a film or sheet) at high speed over a broad, dynamic range, and which can freely change a size of a measurement spot.

In order to resolve the above-noted issues, a thickness measurement apparatus according to the present invention includes: a light source emitting light; an optical system focusing the light emitted from the light source onto an optical axis; a reflecting portion reflecting the light focused by the optical system; a detection portion detecting an intensity of the reflected light according to a focus position on the optical axis of the light passing through the optical system; and a calculator calculating a thickness of a measured object using a refractive index of the measured object and an amount of displacement between a first focus position and a second focus position, the first focus position lying on the optical axis where a peak in reflected light intensity is detected by the detection portion for light reflected by the reflecting portion in a case where the measured object is not positioned between the optical system and the reflecting portion, and the second focus position lying on the optical axis where a peak in reflected light intensity is detected by the detection portion for light that has passed through the measured object and been reflected by the reflecting portion in a case where the measured object is positioned between the optical system and the reflecting portion.

According to this configuration, a difference in optical path occurs when comparing a case where light is fired at the measured object with the measured object positioned between the optical system and the reflecting portion, and a case where the measured object is absent. This difference in optical path changes in accordance with the thickness and refractive index of the measured object. Using these properties, the calculator can find the thickness of the measured object quickly and with a high degree of accuracy over a broad, dynamic range using the refractive index of the measured object and the amount of displacement between the first focus position on the optical axis, calculated for a case where the measured object is absent, and the second focus position on the optical axis, calculated for a case where the measured object is in position. In addition, by adjusting a distance between the optical system and the measured object, a size of a measurement spot can be freely changed.

The thickness measurement apparatus according to the present invention may also be configured such that the optical system has axial chromatic aberration on the optical axis; the detection portion includes a spectroscope scattering into each wavelength the reflected light that has passed through a pinhole provided at a confocal point position of the optical system, and a photoreceiver detecting an intensity of the reflected light scattered by the spectroscope; and the calculator calculates the focus position on the optical axis corresponding to the wavelength of the reflected light detected by the photoreceiver. According to this configuration, using the axial chromatic aberration of the optical system, the thickness of the measured object can be found based on the focus position for the wavelength of light passing through the pinhole.

The thickness measurement apparatus according to the present invention may also be configured such that the light emitted from the light source is broadband light. According to this configuration, the thickness of the measured object can be measured within a range of wavelengths included in the broadband light.

The thickness measurement apparatus according to the present invention may also be configured such that the light source is a white light source. According to this configuration, the thickness of the measured object can be measured within a range of wavelengths included in the white light emitted from the white light source.

The thickness measurement apparatus according to the present invention may also be configured such that the calculator calculates the thickness of the measured object using $t=\{n/(n-1)\}\times\Delta Z$, where $\Delta Z$ is the amount of displacement between the first focus position and the second focus position, n is the refractive index of the measured object, and t is the thickness of the measured object. According to this configuration, the thickness t of the measured object can be found quickly and with a high degree of accuracy over a broad, dynamic range by performing calculation using the calculator.

The thickness measurement apparatus according to the present invention may also be configured such that a core portion on an end surface of an optical fiber is regarded as the pinhole and the reflected light is transmitted via the optical fiber. According to this configuration, the core portion on the end surface of the optical fiber is regarded as the pinhole, and the reflected light focused at the core portion, which is the confocal point, can be collected via the optical fiber.

A thickness measurement method according to the present invention includes: focusing light emitted from a light source onto an optical axis using an optical system and firing the focused light at a reflecting portion; detecting a first focus position on the optical axis, where a peak in reflected light intensity is formed, for light reflected by the reflecting portion in a state where a measured object is not positioned between the optical system and the reflecting portion; detecting a second focus position on the optical axis, where a peak in reflected light intensity is formed, for light passing through the measured object and reflected by the reflecting portion in a state where the measured object is positioned between the optical system and the reflecting portion; and calculating a thickness of the measured object using a refractive index of the measured object and an amount of displacement between the first focus position and the second focus position.

According to this configuration, an optical path difference occurs when comparing a case where light is fired at the measured object with the measured object positioned between the optical system and the reflecting portion, and a case where the measured object is absent. This optical path difference changes in accordance with the thickness and refractive index of the measured object. Using these properties, the thickness of the measured object can be found quickly and with a high degree of accuracy over a broad, dynamic range using the refractive index of the measured object and the amount of displacement between the first focus position on the optical axis, calculated for a case where the measured object is absent, and the second focus position on the optical axis, calculated for a case where the measured object is in position. In addition, by adjusting a distance between the optical system and the measured object, a size of a measurement spot can be freely changed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. In the following description, portions identical to those which have been previously described are assigned identical reference numerals and a description thereof is omitted where appropriate.

First Embodiment

Figure 1:
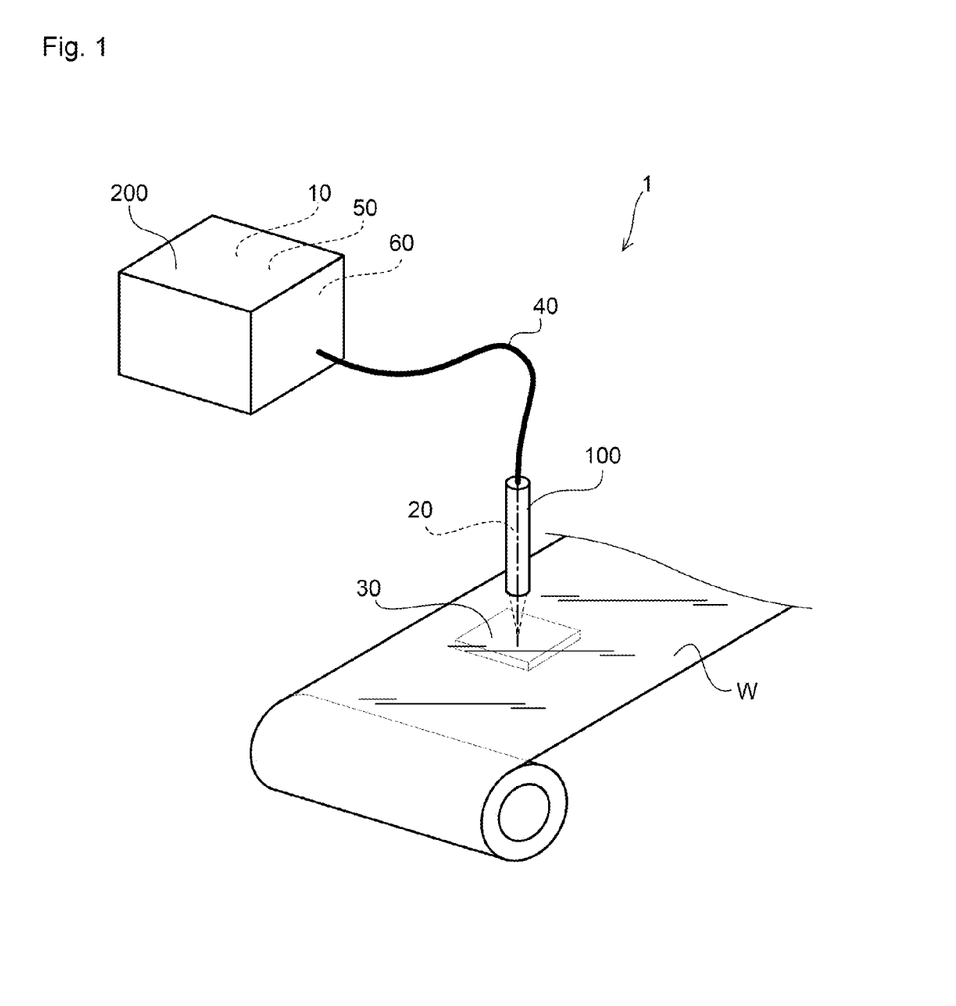
FIG. 1 is a schematic view illustrating an exemplary thickness measurement apparatus according to a first embodiment.

FIG. 1 is a schematic view illustrating an exemplary thickness measurement apparatus according to a first embodiment. As shown in FIG. 1, a thickness measurement apparatus 1 according to the present embodiment includes a sensor head 100 and a console 200, and conducts optical, non-contact measurement of a thickness of a work piece W to be measured.

The sensor head 100 and the console 200 are connected by an optical fiber 40. The thickness measurement apparatus 1 measures the thickness of the work piece W using reflected light of light that was emitted from the sensor head 100. In the present embodiment, the work piece W is formed by a material sufficiently transparent to the light emitted from the sensor head 100. The work piece W may be a transparent film, for example.

In the present embodiment, a mirror 30 (a reflecting portion or reflector) is provided below the work piece W (on an opposite side of the work piece W from the sensor head 100). With this configuration, a highly accurate thickness measurement can be performed even when the work piece W is translucent.

Figure 2A:
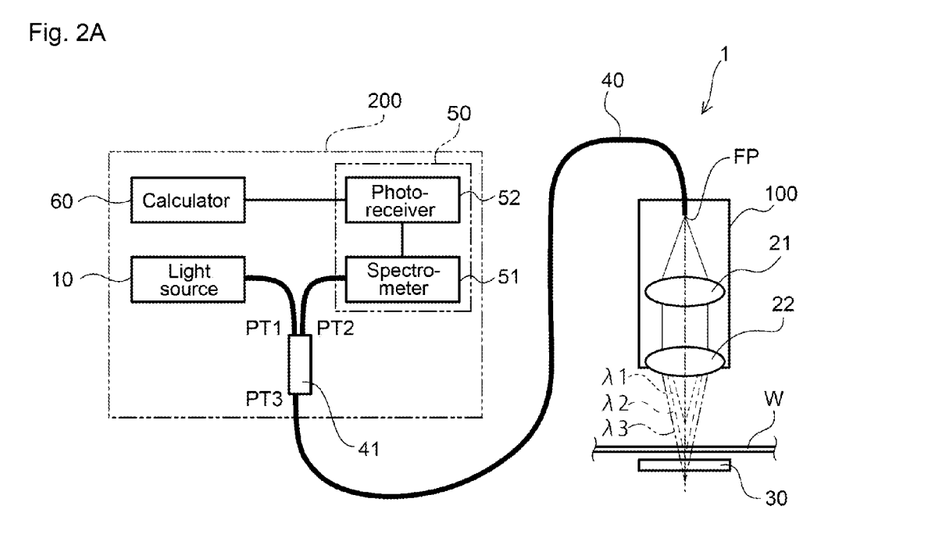
FIG. 2A is a block diagram illustrating an exemplary configuration of the thickness measurement apparatus according to the first embodiment.

FIG. 2A is a block diagram illustrating an exemplary configuration of the thickness measurement apparatus according to the first embodiment. As shown in FIG. 2A, a light source 10, a detection portion (detector) 50 (a spectroscope 51 and photoreceiver 52), and a calculator 60 are provided to the console 200. The console 200 further includes a fiber coupler 41.

The light fired from the light source 10 is broadband light. A white light source (white LED or the like) may be used, for example, as the light source 10. The light fired from the light source 10 is transmitted to the sensor head 100 via the fiber coupler 41 and the optical fiber 40.

An optical system 20 is embedded in the sensor head 100. The optical system 20 focuses the light fired from the light source 10 on an optical axis. The optical system 20 includes a collimating lens 20 and a field lens 22.

The collimating lens 21 converts light fired from the light source 10 and emitted through the optical fiber 40 into parallel light. The collimating lens 21 is a lens having little axial chromatic aberration. With the collimating lens 21 having little axial chromatic aberration, parallel light following the optical axis from the field lens 22 toward the collimating lens 21 is focused onto a single point on the optical axis (confocal point FP) regardless of wavelength. Moreover, the collimating lens 21 may be provided when necessary. In a case where the collimating lens 21 is not included, the light emitted from the optical fiber 40 may strike the field lens 22 unchanged.

The field lens 22 is positioned closer to the work piece W than the collimating lens 21, i.e., toward a forefront end of the sensor head 100. The field lens 22 is a lens having significant axial chromatic aberration. The field lens 22 focuses the light that was made parallel by the collimating lens 21 onto the work piece W-side optical axis.

When the parallel light incident on the field lens 22 from the collimating lens 21 passes through the field lens 22, which has significant axial chromatic aberration, focal points resolve at different positions on the optical axis depending on the wavelength of the light. In other words, a focal length on the optical axis of the light passing through the field lens 22 differs depending on the wavelength of the light. Using the field lens 22, the shorter the wavelength, the shorter the focal length becomes and the longer the wavelength, the longer the focal length becomes. For example, blue light, green light, and red light have increasing focal lengths in that order.

The mirror 30 is positioned on an opposite side of the work piece W from the field lens 22. Of the light reflected by the mirror 30, light belonging to a wavelength component which is in focus on a reflection surface of the mirror 30 is focused at the confocal point FP by the collimating lens 21 via the field lens 22. Meanwhile, light belonging to a majority of wavelength components, which are not in focus at the reflection surface of the mirror 30, is not focused at the confocal point FP and dissipates.

The optical fiber 40 is provided between the sensor head 100 and the console 200. An end surface on the sensor head 100 side of the optical fiber 40 is positioned at the confocal point FP. A core portion (core) of the end surface of the optical fiber 40 can be considered a pinhole positioned at the confocal point FP. The optical fiber 40 receives the reflected light that has passed through the pinhole positioned at the confocal point FP and transmits the reflected light toward the console 200.

An end surface on the console 200 side of the optical fiber 40 is connected to the fiber coupler 41. The optical fiber 40 transmits the light fired from the light source 10 to the sensor head 100 and emits the light toward the collimating lens 21. Meanwhile, of the light reflected by the mirror 30, the optical fiber 40 receives the light that is in focus at the confocal point FP and transmits that light to the console 200.

The fiber coupler 41 of the console 200 includes at least two ports on a first side and at least one port on a second side. The light source 10 is connected to a first port PT1, which is one of the ports on the first side of the fiber coupler 41, and the spectroscope 51 of the detection portion 50 is connected to a second port PT2, which is the other port on the first side. The optical fiber 40 is connected to a third port PT3, which is a port on the second side.

The detection portion 50 includes the spectroscope 51 and the photoreceiver 52. The spectroscope 51 scatters incident light according to the wavelength thereof. Diffraction gating, for example, may be used as the spectroscope 51. The photoreceiver 52 detects an intensity of each wavelength of the reflected light focused at the confocal point FP based on the light transmitted by the optical fiber 40. The photoreceiver 52 includes, for example, an image sensor. The light scattered by the spectroscope 51 according to wavelength is detected by the photoreceiver 52; thereby, the intensity of each wavelength of the reflected light focused at the confocal point FP can be detected based on a position detected by the photoreceiver 52.

Based on the intensity of each wavelength of the reflected light detected by the photoreceiver 52, a calculator 60 calculates a height corresponding to a wavelength at which a peak in reflected light intensity occurs. In the present embodiment, the thickness of the work piece W is calculated using a process described hereafter.

The thickness measurement apparatus 1 according to the present embodiment having this configuration obtains the thickness of the work piece W with a high degree of accuracy using measurement principles of a chromatic confocal-type displacement gauge and a calculation process of the calculator 60.

Here, the measurement principles of the chromatic confocal-type displacement gauge are described. First, light is emitted from the light source 10 and is fired from the field lens 22 of the sensor head 100 toward a measured object. The fired light is in focus at different positions depending on wavelength, due to the axial chromatic aberration of the field lens 22. Of the light reflected by the measured object, light at a wavelength that is not in focus at the front surface of the measured object is not focused at the confocal point FP and only a small amount is collected by the optical fiber 40. Meanwhile, of the light reflected by the measured object, light at a wavelength that is in focus at the front surface of the measured object is focused at the confocal point FP and a majority of the light is transmitted to the spectroscope 51 via the optical fiber 40. Accordingly, in the light collected by the optical fiber 40, the wavelength component that is in focus at the front surface of the measured object has a high intensity, whereas the intensity of other components is weaker.

The light focused at the confocal point FP and transmitted by the optical fiber 40 is delivered to the spectroscope 51. The light delivered to the spectroscope 51 is scattered according to wavelength and reaches the photoreceiver 52. At the photoreceiver 52, received light intensity is detected for each position of light scattered by the spectroscope 51. A detection position of the light in the photoreceiver 52 is set for each wavelength. Therefore, in a case where a peak in received light intensity occurs at a specific detection position, the wavelength corresponding to that detection position can be found. The calculator 60 finds a position (height) of the front surface (reflection surface) of the measured object based on the focal length of the field lens 22 at the wavelength in which the peak occurred.

Figure 2B:
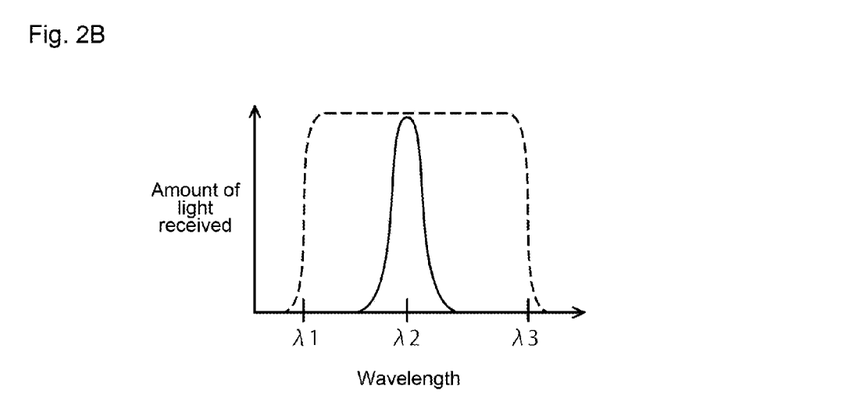
FIG. 2B illustrates an exemplary wavelength distribution of light received by an optical fiber at a confocal point.

FIG. 2B illustrates an exemplary wavelength distribution of light received by the optical fiber 40 at the confocal point FP. A dashed line in FIG. 2B illustrates an exemplary wavelength distribution of white light. An example is discussed in which white light containing wavelengths $\lambda 1$, $\lambda 2$, and $\lambda 3$ is fired at the measured object from the light source 10, and of these wavelengths, the light of wavelength $\lambda 2$ is in focus at the front surface of the measured object.

In such a case, the reflected light of wavelength $\lambda 2$ is focused at the confocal point FP and is collected by the optical fiber 40. The reflected light of the other wavelengths is not focused at the confocal point FP, and therefore is not collected by the optical fiber 40. Accordingly, the optical fiber 40 transmits the light having a peak at the wavelength $\lambda 2$, as shown in FIG. 2B, to the spectroscope 51.

In the spectroscope 51, the light is scattered according to the wavelength $\lambda 2$ and is sent to the photoreceiver 52. In the photoreceiver 52, the intensity (for example, the peak position) of the light scattered by the spectroscope 51 is detected and output to the calculator 60. In addition, based on the information for the position output from the photoreceiver 52, the calculator 60 finds the wavelength $\lambda 2$ corresponding to this position and calculates the focal length corresponding to the wavelength $\lambda 2$. Here, the focal length and the wavelength are in a 1:1 relationship. Therefore, the calculator 60 finds the position (height) of the front surface of the measured object based on the relationship between the wavelength $\lambda 2$ and the focal length.

In this way, with the measurement principles of the chromatic confocal-type displacement gauge, the position (height) of the measured object on the optical axis can be detected based on the wavelength of the light focused at the front surface of the measured object.

Figure 3A:
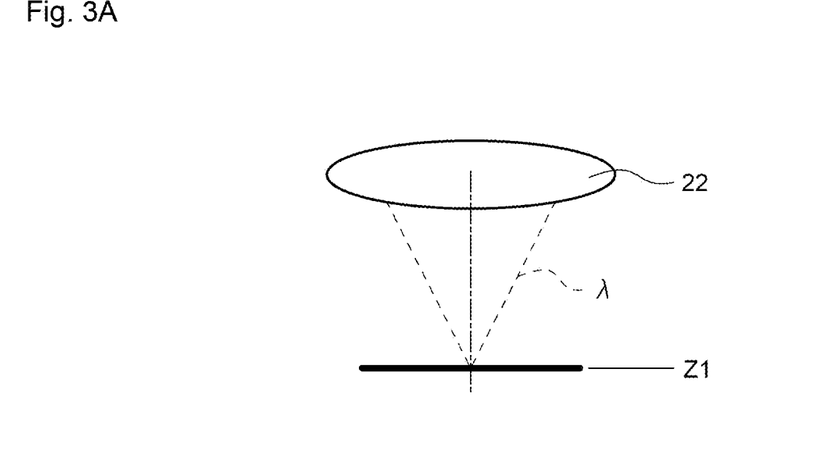
FIGS. 3A and 3B are schematic views illustrating a change in a light condensing point due to the presence or absence of a work piece.
Figure 3B:
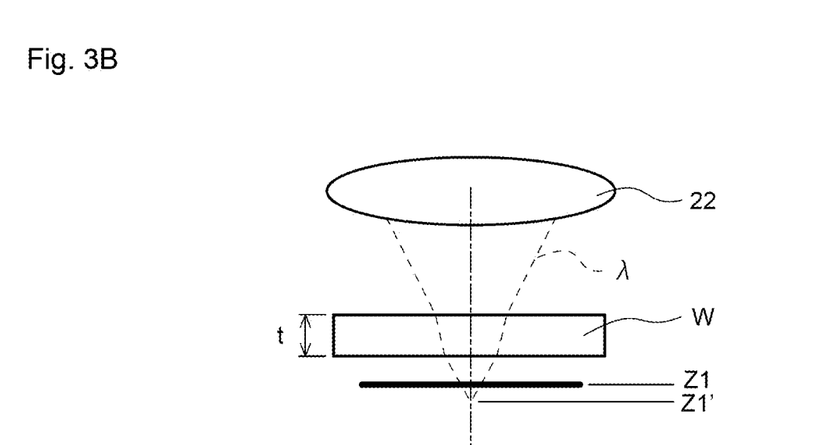

Next, the principles of measuring thickness using the thickness measurement apparatus 1 according to the present embodiment are described. FIGS. 3A and 3B are schematic views illustrating a change in a light condensing point due to the presence or absence of the work piece W. As shown in FIG. 3A, in a case where the work piece W is not positioned below the field lens 22, light of a certain wavelength $\lambda$ is focused at a position Z1 on the optical axis.

Here, as shown in FIG. 3B, a transparent work piece W of thickness t is placed below the field lens 22. In such a case, the light passing through the work piece W from the field lens 22 is refracted when striking the work piece W through air, and when emitted into the air from the work piece W. Accordingly, a light condensing point position Z1 changes to a light condensing point position Z1'.

An amount of change ($\Delta Z$) between the light condensing point position Z1 and the light condensing point position Z1' is represented by the following relational expression (1), using a refractive index n and the thickness t of the transparent work piece W.

$$\Delta Z = \{(n-1)/n\} \times t \quad (1)$$

When the relational expression (1) is transformed, the following relational expression (2) results.

$$t = \{n/(n-1)\} \times \Delta Z \quad (2)$$

The thickness measurement apparatus 1 according to the present embodiment uses the relational expression (2) to measure the thickness t of the transparent work piece W. Specifically, the calculator 60 finds the amount of change ($\Delta Z$) between the position (first focus position) of the mirror 30 on the optical axis as detected by the photoreceiver 52 in a case where the work piece W is not positioned between the optical system 20 and the mirror 30 and the position (second focus position) of the mirror 30 on the optical axis as detected by the photoreceiver 52 for the light that has passed through the work piece W in a state where the work piece W is provided. The calculator then calculates the thickness t of the work piece W from the relational expression using the amount of change ($\Delta Z$) and the refractive index n of the work piece W.

Typically, when attempting to measure the thickness of an extremely thin transparent work piece W using the chromatic confocal-type displacement gauge, the reflected light from the front surface of the work piece W and the reflected light from a back surface of the work piece W are difficult to distinguish because the two lights are too close together, making highly accurate thickness measurement difficult to perform.

In contrast, in the thickness measurement apparatus 1 according to the present embodiment, the reflected light from the front surface and back surface of the work piece W is not what is detected, but rather the reflected light from the mirror 30 positioned below the work piece W. In addition, the thickness t of the work piece W is obtained via calculation based on the refractive index n and the amount of change $\Delta Z$ in the light condensing point between a case where the work piece W is present and a case where the work piece W is absent. Accordingly, no matter how thin the transparent work piece W may be, the reflected light can be accurately assessed and the thickness t can be found with a high degree of accuracy. Moreover, a position where the light focused at the confocal point FP is scattered by the spectroscope is detected, and therefore the thickness t can be measured in a short amount of time without requiring complex calculations.

Figure 4:
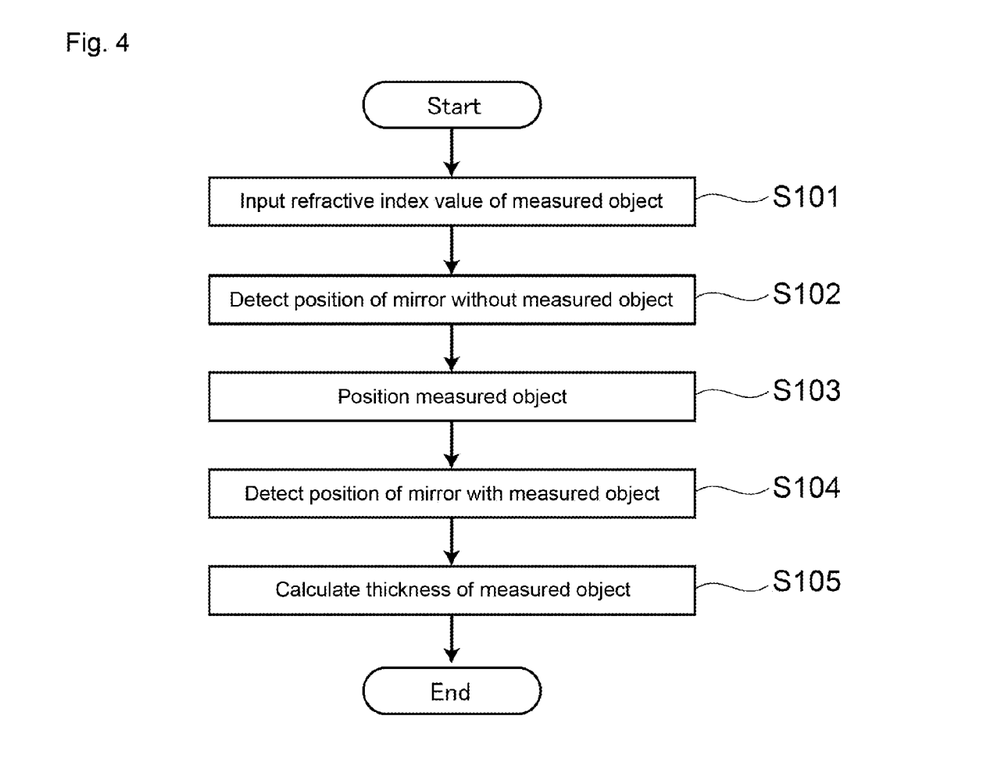
FIG. 4 is a flow chart illustrating an exemplary flow of a thickness measurement method.

A thickness measurement method is now described. In the description that follows, a thickness measurement method utilizing the thickness measurement apparatus 1 according to the present embodiment is given as an example. FIG. 4 is a flow chart illustrating an exemplary flow of the thickness measurement method. First, as shown in step S101, a value is input for a refractive index of the measured object. The input value for the refractive index is stored in a memory not shown in the drawings.

Next, as shown in step S102, a position of the front surface of the mirror 30 is detected without placing the work piece W to be measured in position. In other words, the reflected light from the front surface of the mirror 30 is collected by the optical fiber 40, and the position of the front surface of the mirror 30 on the optical axis is detected by the calculator 60 based on the wavelength component in the light that forms the peak. This position is designated as a first focus position Z10.

Next, as shown in step S103, the work piece W to be measured is positioned between the field lens 22 and the mirror 30. Herein, despite being transparent, the work piece W nonetheless weakly reflects light, and therefore the work piece W is preferably positioned at a slight distance (for example, at a position separated by 50 μm or more) from the mirror 30. This is done in order to prevent the reflected light from the work piece W from affecting the reflected light from the mirror.

Next, as shown in step S104, the position of the front surface of the mirror 30 is detected with the work piece W to be measured in position. In other words, light is fired at the work piece W from the sensor head 100. In addition, the light passing through the work piece W and reflected from the front surface of the mirror 30 is collected by the optical fiber 40, and the position of the front surface of the mirror 30 on the optical axis is detected by the calculator 60 based on the wavelength component in the light that forms the peak. This position is designated as a second focus position Z20.

Next, as shown in step S105, the thickness t of the work piece W to be measured is calculated. In other words, the calculator 60 uses the amount of change ΔZ between the first focus position Z10 and the second focus position Z20 as well as the refractive index n for the work piece W, which was previously stored in the memory, to calculate the thickness t of the work piece W using the relational expression (2) noted above. Thereby, the thickness t of the work piece W can be found.

Figure 5A:
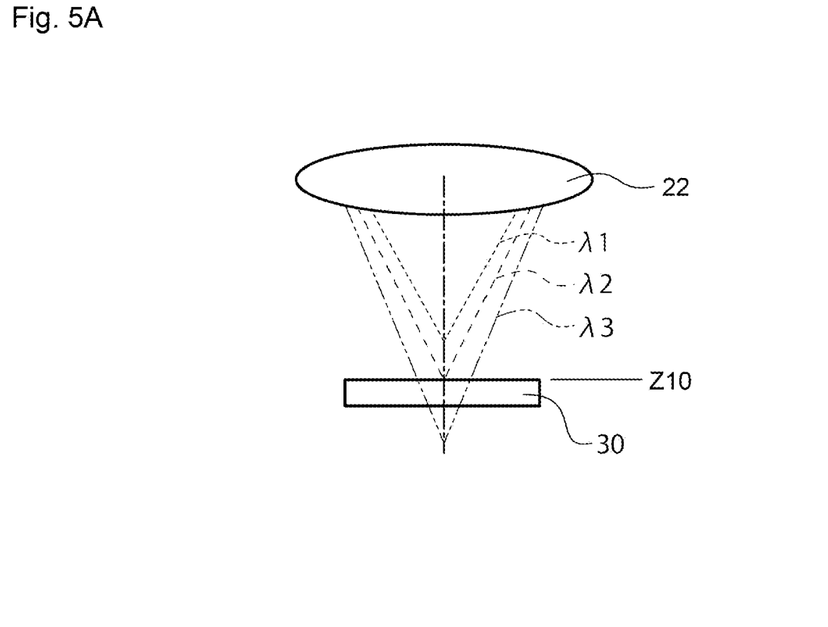
FIGS. 5A and 5B are schematic views illustrating concrete examples of the thickness measurement method.
Figure 5B:
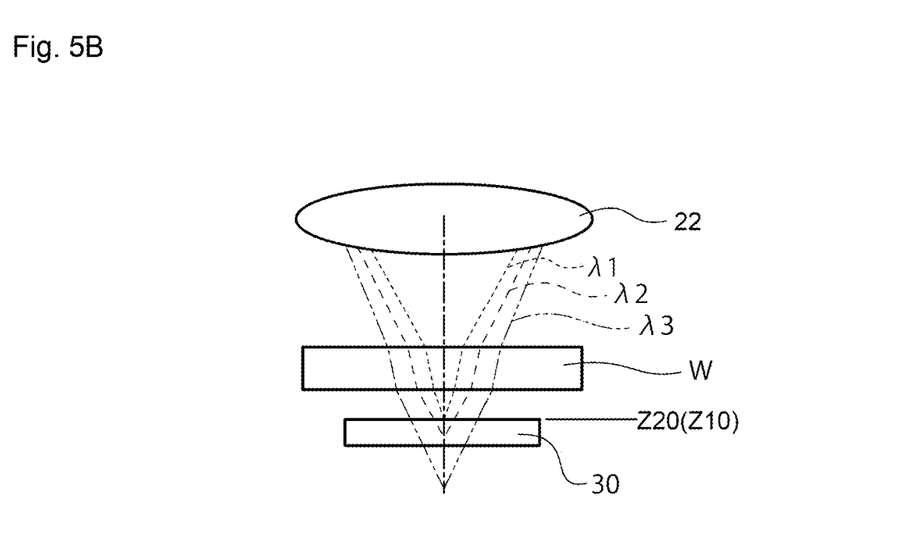

FIGS. 5A and 5B are schematic views illustrating concrete examples of the thickness measurement method. For ease of illustration, light having the wavelengths λ1, λ2, and λ3 is shown in FIGS. 5A and 5B. FIG. 5A illustrates a state in which the position of the front surface of the mirror 30 is measured without the work piece W being positioned below the field lens 22. In the process represented in step S102 in FIG. 4, the position of the front surface of the mirror 30 is detected in this state where the work piece W is not in position. In this example, the position of the mirror 30 on the optical axis (first focus position Z10) is detected based on the light having the wavelength λ2, for which the light condensing point falls on the front surface of the mirror 30.

FIG. 5B illustrates a state in which the position of the front surface of the mirror 30 is measured with the work piece W positioned below the field lens 22. In the process represented in step S104 in FIG. 4, the position of the front surface of the mirror 30 is detected in this state where the work piece W is in position. When the work piece W is positioned, refraction of the light occurs in accordance with the refractive index n and the thickness t of the work piece W, and the focal position becomes more distant as compared to a case where the work piece W is absent.

Accordingly, the light having the wavelength λ2, which is condensed at the front surface of the mirror 30 in a case where the work piece W is absent, condenses at a position more distant than the front surface of the mirror 30. Therefore, in a state where the work piece W is in position, the light having the wavelength λ1, which is shorter than the wavelength λ2, is in focus at the front surface of the mirror 30.

The light having the wavelength λ1 enters the optical fiber 40 from the confocal point FP and is transmitted to the console 200. Based on the wavelength λ1 light, the photoreceiver 52 and the calculator 60 detect the position of the mirror 30 on the optical axis that corresponds to the wavelength λ1 (second focus position Z20). The position of the front surface of the mirror 30 is not changed by the presence or absence of the work piece W. However, the second focus position Z20 (optically detected position of the front surface of the mirror 30) is different from the first focus position Z10.

The calculator 60 finds the amount of change ΔZ between the first focus position Z10 and the second focus position Z20. In addition, the calculator 60 also finds the thickness t of the work piece W using calculations based on the known refractive index n of the work piece W and the amount of change ΔZ.

For example, when the refractive index n of the work piece W is 1.5 and the amount of change ΔZ is 3.3 μm, the thickness t of the work piece W is 10 μm. For example, when using a chromatic confocal-type displacement gauge having a measurement range of 1 mm and an accuracy of 0.3 μm, measurements of the amount of change ΔZ of between 0.3 μm to 1 mm are possible. Therefore, the thickness of the work piece W can be measured in a broad dynamic range of between 1 μm and 3 mm using the thickness measurement method according to the present embodiment.

In the thickness measurement method according to the present embodiment, even when the position of the work piece W along the optical axis changes, there is not any great impact on measurement results. Accordingly, even when the position of the work piece W is slightly shifted in the optical axis direction, the thickness t of the work piece W can be measured.

In addition, in the thickness measurement method according to the present embodiment, a thickness t measurement region is determined by a spot diameter of the light focused by the field lens 22 on the work piece W. Accordingly, in a case where a wide measurement region is desired, the work piece W is brought closer to the field lens 22, and in a case where a narrow measurement region is desired, the work piece W is moved away from the field lens 22. As the measurement region becomes wider, the average thickness t can be measured. As the measurement region becomes narrower, the thickness t of a single point can be measured.

In addition, when a broadband light source that includes near infrared light is used as the light source 10, a Si (silicon) wafer or the like having high transmittance in this wavelength band is considered a transparent body, and the thickness thereof can be measured with the same method as described above.

First Exemplary Application

Figure 6:
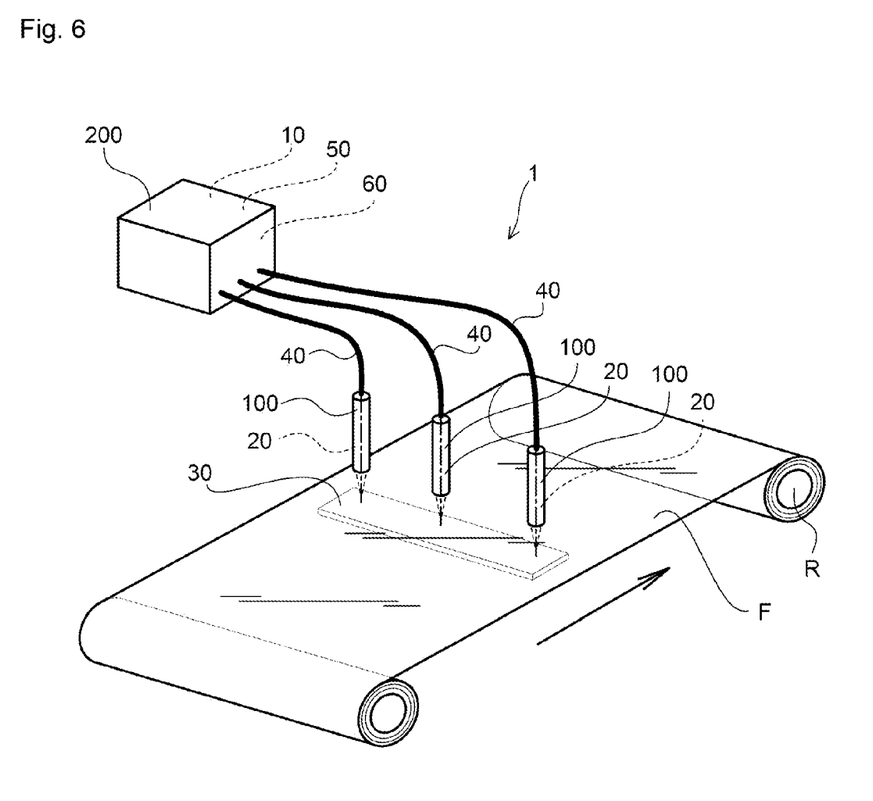
FIG. 6 is a perspective view illustrating a first exemplary application.

Next, a first exemplary application of the thickness measurement apparatus 1 and the thickness measurement method according to the present embodiment is described. FIG. 6 is a perspective view illustrating the first exemplary application. The first exemplary application is an example in which thickness is measured while feeding out a roll-shaped transparent film F. The transparent film F, which is wound into a roll shape, is fed out while being wound onto a wind-up-direction roller R. The sensor head 100 of the thickness measurement apparatus 1 according to the present embodiment is positioned above the feed-out path of the transparent film F. In the example shown in FIG. 6, a plurality of sensor heads 100 (three in FIG. 6) are positioned in a direction (width direction) orthogonal to a feed-out direction of the transparent film F. The mirror 30 is positioned on an opposite side of the transparent film F from the sensor heads 100.

In order to measure the thickness of the transparent film F, the position of the front surface of the mirror 30 in a state where the transparent film F is not present (first focus position) is detected before beginning. Thereafter, the reflected light from the mirror 30 is collected from the light passing through the transparent film F while the transparent film F is being fed out, and the position of the front surface of the mirror 30 (second focus position) is detected. The calculator 60 calculates the thickness of the transparent film F using the amount of change ΔZ between the first focus position and the second focus position, as well as the refractive index of the transparent film F.

In the thickness measurement apparatus 1 and the thickness measurement method according to the present embodiment, even when the position of the transparent film F along the optical axis changes, there is not any great impact on the measurement results. Accordingly, as shown in FIG. 6, even when a slight vertical oscillation occurs when feeding out the transparent film F, the thickness of the transparent film F can be measured stably. Therefore, thickness can be checked in-line in a process of manufacturing the transparent film F, for example.

Second Exemplary Application

Figure 7:
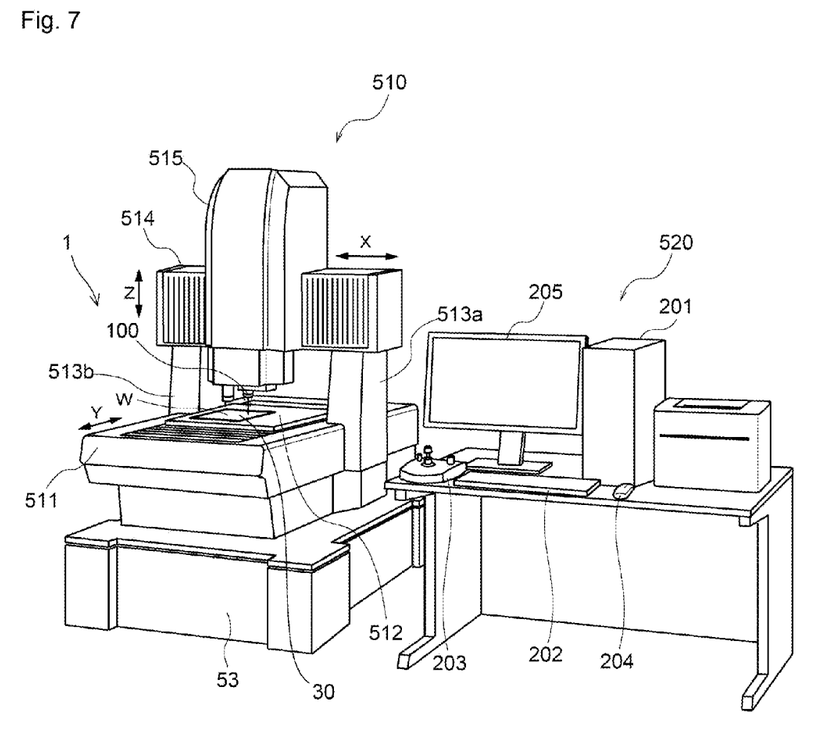
FIG. 7 is a perspective view illustrating a second exemplary application.

Next, a second exemplary application of the thickness measurement apparatus 1 and the thickness measurement method according to the present embodiment is described. FIG. 7 is a perspective view illustrating the second exemplary application. The second exemplary application is an example in which the thickness measurement apparatus 1 and the thickness measurement method are applied to an image measurement apparatus 500.

The image measurement apparatus 500 includes a device main body 510 and a computer system 520. The device main body 510 includes a table 511, a stage 512, an X-axis guide 514, and an image capture unit 515. The table 511 is positioned atop an anti-vibration table 53, for example, and inhibits external vibrations from being transmitted to the stage 512 on the table 511 and to the image capture unit 515.

The stage 512 is positioned above the table 511. The stage 512 is a platform on which the work piece W to be measured is placed. The stage 512 is provided so as be capable of being displaced by a Y-axis drive mechanism (not shown in the drawings) in a Y axis direction (direction following the Y axis) with respect to the table 511.

Supports 513a and 513b are provided on two side portions of the table 511. Each of the supports 513a and 513b are provided so as to extend vertically from the side portions of the table 511. The X-axis guide 514 is provided straddling atop the supports 513a and 513b. The image capture unit 515 is attached to the X-axis guide 514. The image capture unit 515 is provided so as be capable of being displaced along the X-axis guide 514 by an X-axis drive mechanism (not shown in the drawings) in an X axis direction (direction following the X axis).

The image capture unit 515 is provided so as be capable of being displaced by a Z-axis drive mechanism (not shown in the drawings) in a Z axis direction (direction following the Z axis). With this configuration, a relative positional relationship between the work piece W on the stage 512 and the image capture unit 515 can be defined along each of the X, Y, and Z axes. In other words, by adjusting this positional relationship, an image capture region of the image capture unit 515 can be matched to the measurement region of the work piece W.

The computer system 520 includes a computer main body 201, a keyboard 202, a joystick 203, a mouse 204, and a display 205. The computer main body 201 controls operations of the device main body 510 and the like. The computer main body 201 controls the operations of the device main body 510 using a circuit such as a control board (hardware) and a program executed by a CPU (software). In addition, the computer main body 201 calculates data for the work piece W based on a signal output from the device main body 510, and displays the calculation result on the display 205.

The joystick 203 is used when defining the image capture region for the work piece W. Specifically, a user operates the joystick 203 and can thereby change the relative positional relationship between the work piece W and the image capture unit 515, and can adjust the position of the image capture region displayed on the display 205.

The sensor head 100 of the thickness measurement apparatus 1 according to the present embodiment is provided below the image capture unit 515. The mirror 30 is provided below the sensor head 100 on the stage 512. The mirror 30 is provided to a portion of the stage 512. The entire stage 512 may also be the mirror 30. In such a case, the mirror 30 is preferably a planar mirror.

In this way, in the thickness measurement apparatus 1 applied to the image measurement apparatus 500, the work piece W is arranged above the mirror 30 so as to touch the mirror 30. The method of measuring the thickness of the work piece W is similar to that of the first embodiment. In the image measurement apparatus 500, an image of the work piece W can be taken and a three-dimensional position of the work piece W can be measured. In addition, by firing light from the sensor head 100 at the work piece W, the reflected light from the mirror 30 provided to the stage 512 is captured and the thickness of the work piece W can be measured.

Here, the work piece W is in contact with the top of the mirror 30 (there is no separation between the work piece W and the mirror 30), and accordingly both the reflected light from the back surface of the work piece W and the reflected light from the front surface of the work piece W are received. However, when optical reflectance of the mirror 30 is approximately 90% and the optical reflectance of the transparent work piece W is several percent, the reflected light of the work piece W has almost no effect on the reflected light of the mirror 30. Moreover, in a case where there is a desire to completely nullify any effect, a spacer or the like may be provided lifting the work piece W away from the front surface of the stage 512.

As described above, the present embodiment is capable of providing the non-contact thickness measurement apparatus 1 and thickness measurement method, which can detect the thickness of a measured object quickly and with a high degree of accuracy over a broad, dynamic range, and which freely change the size of a measurement spot.

An embodiment of the invention is described above. However, the present invention is not limited to this example. For example, the configuration of the present invention can also be applied to a laser confocal point displacement gauge, a focal point displacement gauge, or the like in which a single wavelength of light is fired from the light source 10 and the focal point position is changed by oscillating the field lens 22 in an optical axis direction with a tuning fork or the like. The configuration of the present invention can also be applied to a displacement gauge measuring a position (height) of a measured object using a focal point position of light. In addition, examples have been described in which the optical fiber 40 is provided between the sensor head 100 and the console 200; however, a configuration is also possible in which light is transmitted without the use of the optical fiber 40. With respect to the above-described embodiments, a person skilled in the art can perform addition, deletion, and design modification of configuration elements as appropriate, and can combine features of the embodiment as appropriate, and such modifications are also included in the scope of the present invention as long as they fall within the subject matter of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A thickness measurement apparatus comprising:
a light source configured to emit light;
an optical system configured to focus the light emitted from the light source onto an optical axis, the optical system having an axial chromatic aberration on the optical axis;
a reflector configured to reflect the light focused by the optical system;
a detector configured to detect an intensity of the reflected light according to a focus position on the optical axis of the light passing through the optical system, the detector including:
a spectroscope configured to scatter, into a plurality of wavelengths, the reflected light that has passed through a pinhole provided at a confocal point position of the optical system; and
a photoreceiver configured to detect an intensity of a wavelength of the reflected light scattered by the spectroscope; and
a calculator configured to calculate a thickness of a measured object using a refractive index of the measured object and an amount of displacement between a first focus position and a second focus position, the first focus position lying on the optical axis where a peak in reflected light intensity is detected by the detector for light reflected by the reflector in a case where the measured object is not positioned between the optical system and the reflector, and the second focus position lying on the optical axis where a peak in reflected light intensity is detected by the detector for light that has passed through the measured object and has been reflected by the reflector in a case where the measured object is positioned between the optical system and the reflector, and to calculate the focus position on the optical axis corresponding to the wavelength of the reflected light detected by the photoreceiver.

2. The thickness measurement apparatus according to claim 1, wherein the light emitted from the light source is broadband light.

3. The thickness measurement apparatus according to claim 1, wherein the light source is a white light source.

4. The thickness measurement apparatus according to claim 2, wherein the light source is a white light source.

5. The thickness measurement apparatus according to claim 1, wherein the calculator is further configured to calculate the thickness of the measured object using:

$$t = \{n/(n-1)\} \times \Delta Z$$

where $\Delta Z$ is the amount of displacement between the first focus position and the second focus position, n is the refractive index of the measured object, and t is the thickness of the measured object.

6. The thickness measurement apparatus according to claim 2, wherein the calculator is further configured to calculate the thickness of the measured object using:

$$t = \{n/(n-1)\} \times \Delta Z$$

where $\Delta Z$ is the amount of displacement between the first focus position and the second focus position, n is the refractive index of the measured object, and t is the thickness of the measured object.

7. The thickness measurement apparatus according to claim 3, wherein the calculator is further configured to calculate the thickness of the measured object using:

$$t = \{n/(n-1)\} \times \Delta Z$$

where $\Delta Z$ is the amount of displacement between the first focus position and the second focus position, n is the refractive index of the measured object, and t is the thickness of the measured object.

8. The thickness measurement apparatus according to claim 4, wherein the calculator is further configured to calculate the thickness of the measured object using:

$$t = \{n/(n-1)\} \times \Delta Z$$

where $\Delta Z$ is the amount of displacement between the first focus position and the second focus position, n is the refractive index of the measured object, and t is the thickness of the measured object.

9. The thickness measurement apparatus according to claim 1, wherein a core on an end surface of an optical fiber is the pinhole, and the reflected light is transmitted via the optical fiber.

10. A thickness measurement method comprising:
focusing light emitted from a light source onto an optical axis using an optical system and emitting the focused light at a reflector, the optical system having an axial chromatic aberration on the optical axis;
detecting a first focus position on the optical axis, where a peak in reflected light intensity is formed, for light reflected by the reflector in a state where a measured object is not positioned between the optical system and the reflector;
detecting a second focus position on the optical axis, where a peak in reflected light intensity is formed, for light passing through the measured object and reflected by the reflector in a state where the measured object is positioned between the optical system and the reflector;
scattering, into a plurality of wavelengths, reflected light that has passed through a pinhole provided at a confocal point position of the optical system;
detecting an intensity of a wavelength of the reflected light that is scattered;
calculating a thickness of the measured object using a refractive index of the measured object and an amount of displacement between the first focus position and the second focus position; and
calculating a focus position on the optical axis corresponding to the wavelength of the detected reflected light.

* * * * *